United States Patent
Martins et al.

(10) Patent No.: US 8,732,704 B2
(45) Date of Patent: *May 20, 2014

(54) SUPPORT FOR PERSONAL COMPUTING IN A PUBLIC COMPUTING INFRASTRUCTURE BY USING A SINGLE VM DELTA IMAGE FOR EACH VM BASE IMAGE UTILIZED BY A USER

(75) Inventors: Fernando C. M. Martins, Hillsboro, OR (US); Michael Kozuch, Export, PA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,584

(22) Filed: Jul. 16, 2012

(65) Prior Publication Data

US 2012/0284716 A1 Nov. 8, 2012

Related U.S. Application Data

(63) Continuation of application No. 11/394,833, filed on Mar. 31, 2006, now Pat. No. 8,225,314.

(51) Int. Cl.
*G06F 9/455* (2006.01)

(52) U.S. Cl.
USPC .......................................................... 718/1

(58) Field of Classification Search
USPC .......................................................... 718/1
See application file for complete search history.

(56) References Cited

U.S. PATENT DOCUMENTS

| | | | |
|---|---|---|---|
| 6,804,774 B1 | 10/2004 | Larvoire et al. | |
| 7,356,679 B1 | 4/2008 | Le et al. | |
| 7,577,722 B1 | 8/2009 | Khandekar et al. | |
| 8,073,926 B2 * | 12/2011 | Traut et al. | 709/203 |
| 8,112,748 B2 | 2/2012 | Pomerantz | |
| 8,225,314 B2 | 7/2012 | Martins et al. | |
| 2004/0205203 A1 | 10/2004 | Peinado et al. | |
| 2005/0108709 A1 | 5/2005 | Sciandra et al. | |
| 2005/0204013 A1 | 9/2005 | Raghunath et al. | |
| 2005/0235045 A1 | 10/2005 | Narayanaswami et al. | |

OTHER PUBLICATIONS

Kozuch, Michael. "Enterprise Client Management with Internet Suspend/Resume". Intel Technology Journal, vol. 8, Iss. 4, p. 313-323; Nov. 1, 2004.

\* cited by examiner

*Primary Examiner* — Abdullah Al Kawsar
*Assistant Examiner* — Brian Chew
(74) *Attorney, Agent, or Firm* — Barnes & Thornburg LLP

(57) ABSTRACT

A method and system for supporting personal computing in a public computing infrastructure. The system includes a plurality of computers to be used by patrons of the public computing infrastructure. The system includes a server coupled to the plurality of computers via a network connection. Each of the plurality of computers includes a virtual machine monitor, which includes a plurality of base virtual machine images. Each of the base virtual machine images is customized for a particular hardware and software configuration representing a specific computing environment. The virtual machine monitor launches one of the plurality of base virtual machine images, arbitrates access to system resources via the launched virtual machine image, stores the changes in the state of the virtual machine image when a user terminates a session, and returns a computer to an appropriate state to enable the user to resume the terminated session in subsequent sessions.

18 Claims, 2 Drawing Sheets

SUPPORT FOR PERSONAL COMPUTING IN A PUBLIC COMPUTING INFRASTRUCTURE BY USING A SINGLE VM DELTA IMAGE FOR EACH VM BASE IMAGE UTILIZED BY A USER

CROSS-REFERENCE TO RELATED U.S. PATENT APPLICATION

This application is a continuation application of U.S. application Ser. No. 11/394,833, entitled "SUPPORT FOR PERSONAL COMPUTING IN A PUBLIC COMPUTING INFRASTRUCTURE BY USING A SINGLE VM DELTA IMAGE FOR EACH VM BASE IMAGE UTILIZED BY A USER," filed Mar. 31, 2006 and now U.S. Pat. No. 8,225,314.

BACKGROUND OF THE INVENTION

1. Field of the Invention

The present invention is generally related to the field of public computing infrastructures. More particularly, the present invention is related to a system and method for enabling a personal computing experience on a public computing infrastructure.

2. Description

A majority of people in the world today want access to personal computers (PCs) and the Internet, but cannot afford the cost of owning a personal computer (PC) or the cost of subscribing to an Internet service. One alternative for people that cannot afford to own an Internet-connected PC is a public computing infrastructure. Public computing infrastructures, like Internet Cafés and the like, are very popular solutions in emerging markets today.

The typical user experience in an Internet Café (iCafé) is poor when compared to a privately owned PC. For example, a user's personal preferences, preferred applications, and personal data are not available at login. The user has to rely on limited functionality of browser-based applications/services and carry personal data on a transportable medium. Media intensive usage models, such as, for example, audio, video, and photo collection, are impractical as they require users to carry and configure their own high capacity portable drives. To play a game, the user must carry the original compact disc (CD) so that it can be installed each time the user visits the Internet Café and the game status must be saved on a portable medium. In other words, a user is not able to keep anything persistent on the computer. These inconveniences limit the usage of public computers.

Operations of an Internet Café can be complex and offer the user very limited quality of service (QoS). For example, system operators cannot ensure that a public computer is safe after a user has finished a session. Software installations by a user, virus attacks, system file removal, etc. are just some of the events that may put a public computer in an unusable or unsafe state. Such events require frequent re-building of the public computers, which also reduces overall availability of the public computers.

Thus, what is needed is a system and method for enabling a user to have a personal computing experience in a public computing infrastructure, such as, for example, an iCafé or the like. What is also needed is a system and method for enabling a user of a public computing infrastructure to maintain a persistent state for later repeat use.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for enabling a user to have a personal computing experience in a public computing infrastructure. Embodiments of the present invention employ virtual machines in the client computers to support grid computing. The client computers use virtual machine monitors (VMMs) to implement virtual machine (VM) images and to restore the client computer to an appropriate state based on a user's configuration during the user's previous session using delta images that are stored on servers.

Although embodiments of the present invention are directed to iCafés, the invention is not limited to iCafés. One skilled in the relevant art(s) would know that embodiments of the invention may also be applicable to any public computing infrastructure in which a user has the ability to maintain their personal computing environment on a client computer whenever the user patronizes the public computing infrastructure.

Figure 1:
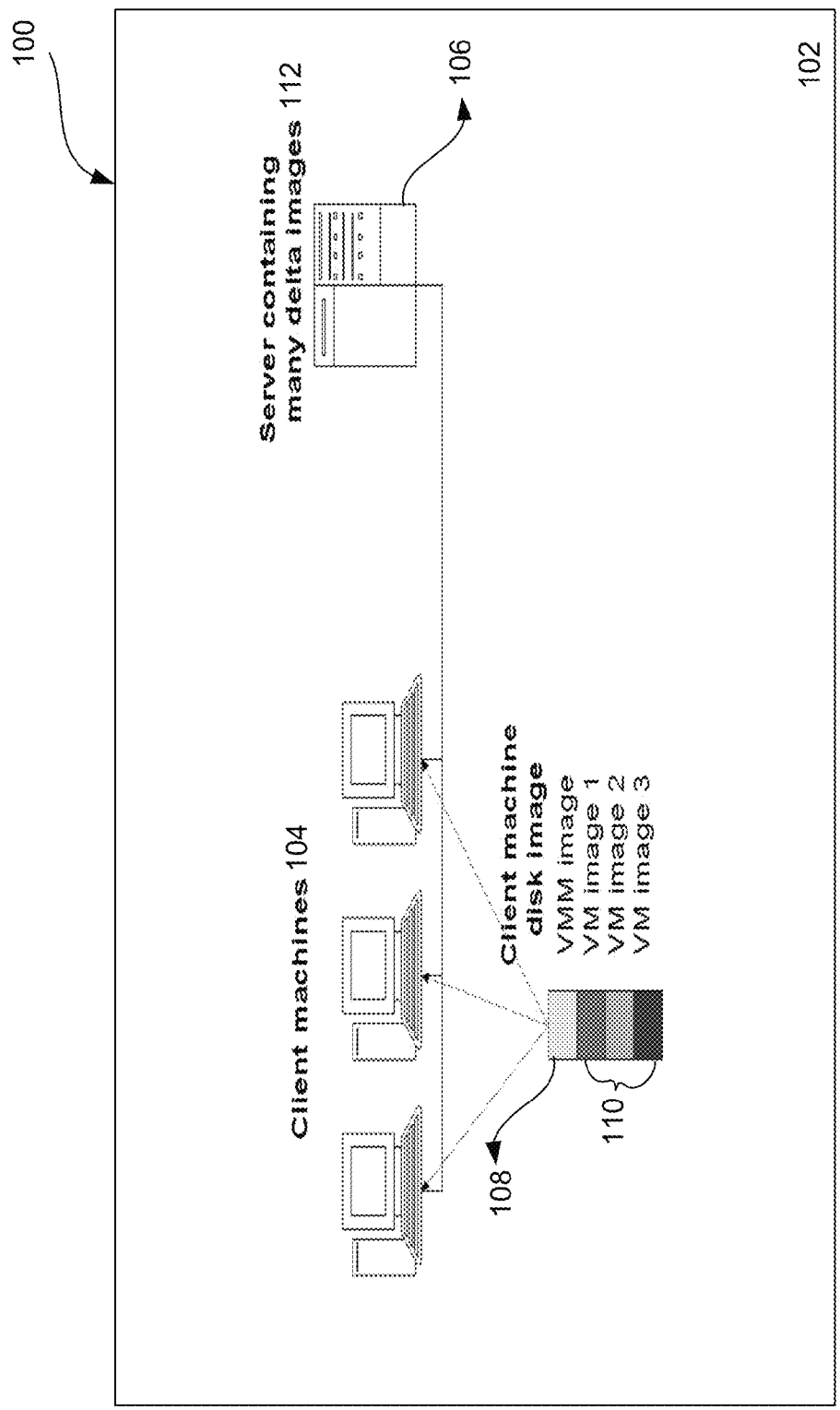
FIG. 1 is a block diagram illustrating an exemplary system for enabling a personal computing experience in a public computing infrastructure according to an embodiment of the present invention.

FIG. 1 is a block diagram illustrating an exemplary system 100 for enabling a personal computing experience in a public computing infrastructure according to an embodiment of the present invention. System 100 comprises a public computing infrastructure 102 having a plurality of computers 104 and one or more servers 106. Each of computers 104 are coupled to one or more servers 106 via a network connection (not shown). The network connection may be a wired or wireless network connection.

Computers 104 are client computers that may be used by patrons of public computing infrastructure 102. Each computer 104 comprises a virtual machine monitor (VMM) 108 that is capable of launching a plurality of canonical base-environment images referred to as virtual machine images 110. VMM 108 launches one of the virtual machine images 110 and arbitrates access to system resources. VMM 108 supports one virtual machine image 110 running at a time.

Each virtual machine image 110 is customized for a particular hardware/software configuration and represents a specific computing environment. For example, each virtual machine image 110 comprises an operating system and specific device drivers for devices in, or attached to, the computer 104 on which it is launched. For example, one virtual machine image 110 may comprise a Windows XP Operating System, developed by Microsoft Corporation, device drivers for devices such as, for example, a keyboard, a mouse, a graphics card, a network interface card, a printer, a hard drive, and a facsimile machine, and software, such as, but not limited to, Word, Access, and Power Point, all developed by Microsoft Corporation. Another virtual machine image 110 may comprise a Windows 2000 Operating System, developed by Microsoft Corporation, device drivers for devices such as, but not limited to, a keyboard, a mouse, a graphics card, a network interface card, a color printer, a scanner, and a hard drive, and software, such as WordPerfect. Yet another virtual machine image 110 may comprise a UNIX operating system such as, for example, Linux, device drivers for devices such as, but not limited to, a keyboard, a mouse, a graphics card, a network interface card, a color printer, a scanner, a hard drive, a CD (compact disc) drive, and a DVD (digital video disc) drive, and software that operates in a UNIX environment. Thus, virtual machine image 110 may include a combination of an operating system with one or more device drivers for the devices in, or attached to, computer 104, along with specific software packages that run on the operating system.

In an embodiment, one or more virtual machine images 110 may be stored directly on computer 104. In another embodiment, virtual machine images 110 may be stored on one or more servers 106. In yet another embodiment, virtual machine images 110 may be stored on a transportable medium, such as, for example, a compact disc (CD) or the like.

Access to physical devices on computer 104 is arbitrated by VMM 108. Devices that are critical to the proper execution of computer 104 or VMM 108 may be managed exclusively by VMM 108, and any accesses to these critical devices from virtual machine image 110 may be arbitrated by VMM 108. Critical devices may include, but are not limited to, programmable timers, interrupt controllers, and memory controllers. Similarly, access to devices that are shared by multiple virtual machine images 110 and/or VMM 108, such as printers, scanners, facsimile devices, shared hard drives, shared disc drives, etc., is arbitrated by VMM 108. Access to devices that are neither critical nor shared may either be arbitrated by VMM 108 or accessed directly by executable software in virtual machine image(s) 110. Such devices may include I/O (input/output) devices such as, but not limited to, a keyboard, a mouse, a graphics card, one or more unshared disc drives, and a network interface card (NIC).

One or more servers 106 store a virtual machine (VM) delta image 112 associated with each patron of public computing infrastructure 102. Delta images 112 represent the changes patrons have made to their base VM image 110 (i.e., the image that is launched when a patron logs into the system). Thus, for a new patron, delta image 112 is the virtual machine image 110 selected by the patron, which may be referred to as the base image. For a repeat patron, VM delta image 112 represents the changes the repeat patron made to his/her base image during the previous session, immediately before the patron placed computer 104 in a suspended or powered-down state. VM delta images 112 are small because they are recorded as differential updates with respect to the canonical VM image 110. The storage of VM delta images 112 allows system 100 to maintain a virtual personal computing environment in a public computer, such as computer 104, and keep that configuration over time and space.

In one embodiment, snapshots of a patron's personal environment may be saved at predetermined intervals. This enables a patron to retrieve a snapshot at a later time on the same computer 104 or on a different computer 104 for any reason.

A requirement for the software included in virtual machine image 110 is that it should support a mechanism for bringing computer 104 to a quiescent state upon user logout. Upon a user's request, the operating system could place the machine in a suspended state at the termination of a user's session. In one embodiment, the user may be required to bring computer 104 to a powered-down state. This state may be achieved by terminating the operating system in virtual machine image 110 or by causing the virtual machine environment to enter a suspend-to-disk or hibernation state.

In one embodiment, VMM 108 launches automatically when computer 104 is booted. In this instance, code corresponding to VMM 108 is resident on a hard disk on computer platform 104. In alternative embodiments, code corresponding to VMM 108 may be located on another medium, such as, for example, a Compact Disc Read-Only Memory (CD-ROM), firmware, network boot, etc. In this instance, when the medium containing the code is inserted into a device attached to computer 104 that is capable of reading the code, VMM 108 will be launched.

When a user requests that their environment be reconstructed on computer 104, wherein computer 104 is either the same computer utilized by their last session or computer 104 is another computer 104, VMM 108 returns the physical platform to the appropriate state. For example, if the user environment was placed in a suspended state, VMM 108 will return the platform to a state that is compatible with emerging from the suspended state. Alternatively, if the user environment was placed in a powered-down state, VMM 108 will start the user's computer 104 in an environment that is consistent with the computer that had been powered-down.

System 100 enables system administrators to ensure that a client configuration is always safe. Viruses, personal data, personal applications, etc. are encapsulated in a user's personal machine image and wiped from computer 104 before a new user logs onto computer 104.

In one embodiment, a user's state is kept for a limited or predetermined time to avoid storing unused data. In one embodiment, users may be required to come back to public computing infrastructure 102 within a predetermined time limit. For example, if a user has a stored delta image that has not been used for more than 60 days, the stored delta image for the user may be erased. In one embodiment, the user may be notified prior to erasing the stored delta image to give the user an opportunity to keep the delta image stored on the server. In one embodiment, a user may pay a nominal fee for storage of an unused state. The user may also save their state on a recordable medium during a prolonged absence from public computing infrastructure 102.

With embodiments of the present invention, an owner of public computing infrastructure 102 may be able to leverage system 100 to perform certain maintenance operations. For example, VMM 108 remains resident and privileged during a user's session, and can interrupt the user's session if unwanted activity is determined to be coming from the virtual machine environment. VMM 108 may also be used to enforce certain policies, such as, but not limited to, time limits on user sessions. When delta images are stored on one or more servers 106, offline processes may inspect them for viruses and take appropriate actions such as upgrading software, applying patches, and removing viruses. As a premium service, offline processes may also create checkpoints of the user delta images so that users can revert their environments to previous versions if their environment becomes corrupted through malicious software or by accident. Finally, the system administrator can clone environments upon request to create identical gaming environments.

Figure 2:
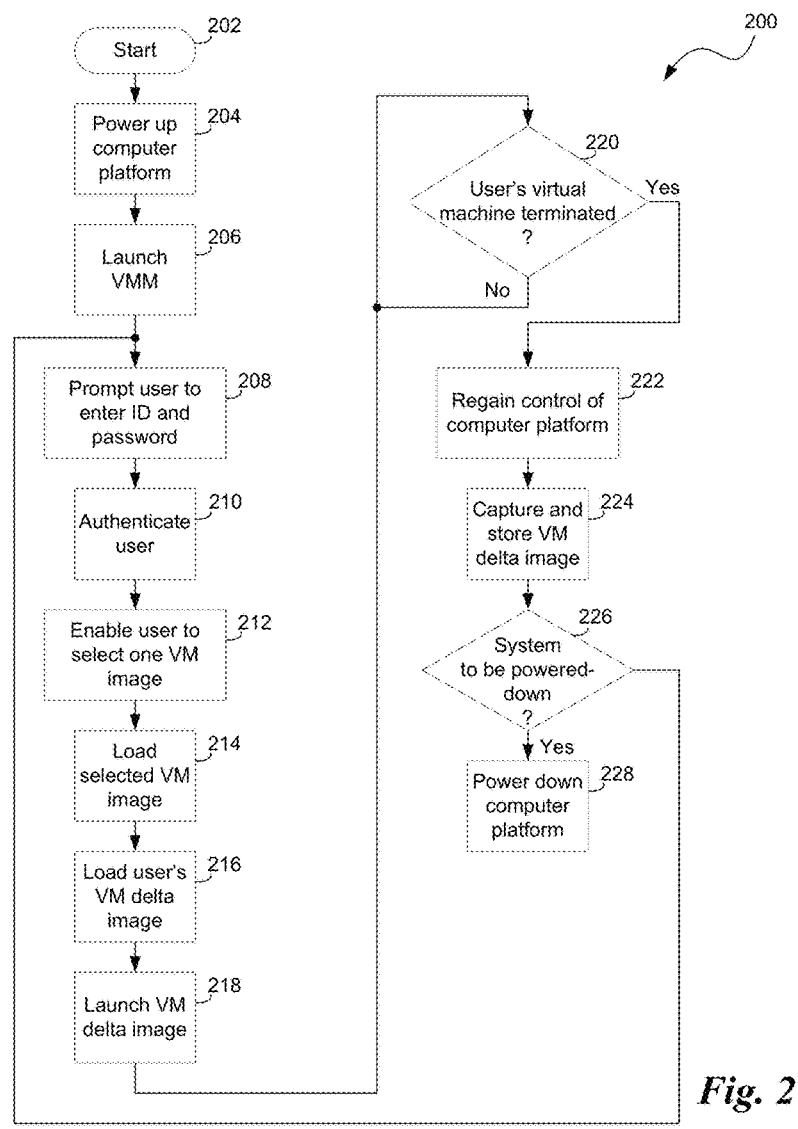
FIG. 2 is a flow diagram describing an exemplary method for enabling a personal computing experience in a public computing infrastructure according to an embodiment of the present invention.

FIG. 2 is a flow diagram 200 describing an exemplary method for enabling a personal computing experience in a public computing infrastructure according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, the computer platform is powered-on. Upon power-on, a virtual machine monitor (VMM) is launched (block 206). As previously indicated, the VMM is responsible for returning a computer platform to the appropriate state for a user of the system. In one embodiment, the code for the VMM may be resident on a hard drive on the computer platform. In alternative embodiments, the code for the VMM may be located on another medium, such as, for example, a CD-ROM, firmware, option ROM, FLASH memory device, network boot, etc. The process then proceeds to block 208.

In block 208, a user is prompted by a login screen to enter his/her user identification and password. Once the user identification and password has been entered, the user is authenticated (block 210). Authentication merely ensures that the user is who he or she claims to be, and is well known in the relevant art(s). The process then proceeds to block 212.

In block 212, once the user has been authenticated, the user is provided a menu of possible canonical virtual machine (VM) images from which to select a single VM image, most suitable for the user, for running on the VMM. As previously indicated, the VMM only supports one VM image running at a time. In one embodiment, the VM images are stored directly on the client computer. Each VM image represents a different computing environment that is customized for the particular hardware on the computer platform. For example, each VM image may represent a different operating system with the same device drivers or the VM images may contain the same operating system with different device drivers. Once the user has selected a VM image with an environment most suitable for the user, the process proceeds to block 214.

In block 214, the VMM loads the selected canonical VM image. The process then proceeds to block 216.

In block 216, the user's VM delta image will be retrieved from the server and loaded onto the computer platform. If the user is a new user, the VM delta image that will be retrieved from the server is a null image indicating that no changes are to be made to the VM image.

The VM delta image may only be loaded onto the computer after a user is authenticated to prevent providing a VM delta image to the wrong person. As previously indicated, VM delta images are recorded as differential updates with respect to the VM image and, therefore, are small. The process then proceeds to block 218.

In block 218, the VM delta image is launched. Launching the VM delta image enables the computer platform to be placed in a resume state. In other words, the computer platform has now resumed the state in which it was in prior to the user logging off the system during the user's previous session. A virtual machine for the user has now been completely established and the user may now resume execution of his/her session exactly where he/she left off previously. In the case of a new user, the new user may now start his/her session for the first time. At this point, the user's experience becomes a personal one. The user's personal preferences are loaded into the machine, giving the user the ability to perform activities on the computer as if it were his/her own personal computer. The process proceeds to decision block 220.

In decision block 220, it is determined whether execution of the user's virtual machine has terminated. To determine whether execution of the user's virtual machine has terminated, one must determine whether the user has requested termination of the operating system. For example, in the case of a Window's Operating System developed by Microsoft Corporation, if the user selects hibernate, shut down, or log off, the user is requesting that the virtual machine be terminated. If the user has not made a request to terminate execution of the user's virtual machine, the process remains at decision block 220 until the user makes a request to terminate execution of the user's virtual machine. If the user has made a request to terminate execution of the user's virtual machine, the process proceeds to block 222.

In block 222, the system regains control of the computer, and in block 224, the user's modifications to the VM image are captured. The VM delta image is associated with the VM image selected by the user and stored as a VM delta image. The process then proceeds to decision block 226.

In decision block 226, it is determined whether the user requested that the system be powered down. If the user requested that the system be powered down, the process proceeds to block 228, where the computer platform is powered down.

Returning to decision block 226, if the user did not request that the system be powered down, then the process proceeds back to block 208, where the computer platform waits for another user to log onto the computer.

Embodiments of the present invention may be implemented using hardware, software, or a combination thereof. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include a processor, a storage medium accessible by the processor (including volatile and non-volatile memory and/or storage elements), at least one input device, one or more output devices, and a network connection. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A computing device comprising:
a processor; and
a non-transitory machine readable medium comprising a plurality of instructions stored thereon that in response to being executed by the processor causes the computing device to launch a virtual machine monitor, the virtual machine monitor to:
receive a selection of one of a plurality of virtual machine images by a user of the computing device, each virtual machine image corresponding to a different base computing environment being customized for a particular hardware and software configuration, and the selected virtual machine image corresponding to a first base computing environment;
launch the selected virtual machine image corresponding to the first base computing environment;
retrieve a first-delta image of a plurality of delta images stored remotely from the computing device, the first delta image comprises a differential update, with respect to the selected virtual machine image, that represents one or more changes made by the user to the first base computing environment, wherein only a single delta image is stored for each virtual machine image utilized by the user;
apply the differential update of the first delta image to the selected virtual machine image to restore a personal computing environment of the user; and,
in response to a request by the user to terminate a session of the restored personal computing environment, capture modifications by the user to the first base computing environment to store as the single delta image for the selected virtual machine image.

2. The computing device of claim 1, wherein the virtual machine monitor further to:
receive a selection of a different one of the plurality of virtual machine images by the user of the computing device, the selected different virtual machine image corresponding to a second base computing environment;
launch the selected different virtual machine image corresponding to the second base computing environment;
retrieve a second delta image of the plurality of delta images stored remotely from the computing device, the second delta image comprises a differential update with respect to the selected different virtual machine image that represents one or more changes made by the user to the second base computing environment; and
apply the differential update of the second delta image to the selected different virtual machine to restore a different personal computing environment of the user.

3. The computing device of claim 1, wherein a snapshot of the personal computing environment of the user is saved at predetermined intervals for retrieval at a later time or during another session.

4. The computing device of claim 1, wherein each virtual machine image includes: (i) an operating system; (ii) one or more device drivers for devices of the computing device on which the selected virtual machine image is launched; and (iii) one or more software packages capable of being executed on the operating system.

5. The computing device of claim 1, wherein the plurality of virtual machine images are stored directly on the computing device.

6. The computing device of claim 1, wherein the plurality of virtual machine images are stored on a transportable medium.

7. The computing device of claim 1, wherein the virtual machine monitor further to monitor a user session and to interrupt the user session if unwanted activity is occurring.

8. A non-transitory machine readable medium comprising a plurality of instructions stored thereon that in response to being executed result in a computing device:
receiving a selection of one of a plurality of virtual machine images by a user of the computing device, each virtual machine image corresponding to a different base computing environment being customized for a particular hardware and software configuration, and the selected virtual machine image corresponding to a first base computing environment;
launching the selected virtual machine image corresponding to the first base computing environment;
retrieving a first delta image of a plurality of delta images stored remotely from the computing device, the first delta image comprises a differential update, with respect to the selected virtual machine image, that represents one or more changes made by the user to the first base computing environment, wherein only a single delta image is stored for each virtual machine image utilized by the user;
applying the differential update of the first delta image to the selected virtual machine image to restore a personal computing environment of the user; and
in response to a request by the user to terminate a session of the restored personal computing environment, capturing modifications by the user to the first base computing environment to store as the single delta image for the selected virtual machine image.

9. The non-transitory machine readable medium of claim 8, wherein the plurality of instructions further result in the computing device:
receiving a selection of a different one of the plurality of virtual machine images by the user of the computing device, the selected different virtual machine image corresponding to a second base computing environment;
launching the selected different virtual machine image corresponding to the second base computing environment;
retrieving a second delta image of the plurality of delta images stored remotely from the computing device, the second delta image comprises a differential update with respect to the selected different virtual machine image that represents one or more changes made by the user to the second base computing environment; and
applying the differential update of the second delta image to the selected different virtual machine to restore a different personal computing environment of the user.

10. The non-transitory machine readable medium of claim 8, wherein the plurality of instructions further result in the computing device saving a snapshot of the personal computing environment of the user at predetermined intervals for retrieval at a later time or during another session.

11. The non-transitory machine readable medium of claim 8, wherein each virtual machine image includes: (i) an operating system; (ii) one or more device drivers for devices of the computing device on which the selected virtual machine image is launched; and (iii) one or more software packages capable of being executed on the operating system.

12. The non-transitory machine readable medium of claim 8, wherein the plurality of virtual machine images are stored directly on the computing device.

13. The non-transitory machine readable medium of claim 8, wherein the plurality of virtual machine images are stored on a transportable medium.

14. The non-transitory machine readable medium of claim 8, wherein the plurality of instructions further result in the computing device:
monitoring a user session for unwanted activity; and
interrupting the user session in response to determining unwanted activity is occurring.

15. A data server device comprising:
a non-transitory machine readable medium comprising a plurality of instructions that in response being executed cause the data server device to:
store a delta image for each of a plurality of base virtual machine images utilized by a user on a computing device, each delta image comprises a differential update representing one or more changes made by the user to a different one of the plurality of base virtual machine images;
receive a request from a remote computing device for a first delta image of a plurality of delta images, the first delta image comprises a differential update representing one or more changes made by the user to a first base virtual machine image, wherein only a single delta image exists for each base virtual machine image utilized by the user;
provide to the remote computing device the requested first delta image comprising the differential update representing the one or more changes made by the user to the first base virtual machine image, wherein the differential update of the first delta image is applied to the first base virtual machine image to restore a personal computing environment of the user; and,
in response to a request by the user to terminate a session of the restored personal computing environment, store captured modifications by the user to the first base computing environment as the single delta image for the first base virtual machine image.

16. The data server device of claim 15, wherein the plurality of instructions further cause the data server device to store a delta image for each of a plurality of base virtual machines images utilized by each user of a plurality of users of the computing device.

17. The data server device of claim 15, wherein the plurality of instructions further cause the data server device to one or more of inspect stored delta images for viruses, upgrade software corresponding to the stored delta images, apply patches to the stored delta images, or remove viruses from the stored delta images.

18. The data server device of claim 15, wherein the plurality of instructions further cause the data server device to clone a computing environment in response to receiving a request by the user.

* * * * *